United States Patent
Chu et al.

(10) Patent No.: US 8,694,291 B2
(45) Date of Patent: Apr. 8, 2014

(54) SYSTEM AND METHOD OF WAVEFORM ANALYSIS TO IDENTIFY AND CHARACTERIZE POWER-CONSUMING DEVICES ON ELECTRICAL CIRCUITS

(75) Inventors: Jonathan Michael Chu, San Jose, CA (US); Eric Ping Wu, San Jose, CA (US); Yungnun Mark Chung, Sunnyvale, CA (US); Bertrand J. Kuo, Sunnyvale, CA (US)

(73) Assignee: Verdigris Technologies, Inc., Moffett Field, CA (US)

( * ) Notice: Subject to any disclaimer, the term of this patent is extended or adjusted under 35 U.S.C. 154(b) by 272 days.

(21) Appl. No.: 13/353,513

(22) Filed: Jan. 19, 2012

(65) Prior Publication Data

US 2013/0191103 A1 Jul. 25, 2013

(51) Int. Cl.
*G06F 17/10* (2006.01)
(52) U.S. Cl.
USPC ............................................................. 703/2
(58) Field of Classification Search
USPC ............................................................. 703/2
See application file for complete search history.

(56) References Cited

U.S. PATENT DOCUMENTS 8,560,134 B1 * 10/2013 Lee ................................ 700/291
2004/0225649 A1 * 11/2004 Yeo et al. ........................... 707/3

OTHER PUBLICATIONS

Fitta: (MS thesis): Load Classification and Appliance Fingerprinting for Residential Load Monitoring System; MIT; 2010; 100 pages.*
Du et al.; A Review of Identification and Monitoring Methods for Electric Loads in Commercial and Residential Buildings; IEEE; pp. 4527-4533; 2010.*
Dash et al.; Mining for similarities in time series data using wavelet-based feature vectors and neural networks; Engineering Applications of Artificial Intelligence 20 (2007) 185-201.*
Filippi et al.; Multi-appliance power disaggregation: An approach to energy monitoring; 2010 IEEE International Energy Conference; pp. 91-95; 2010.*
Chan et al.; Harmonics Load Signature Recognition by Wavelets Transforms, International; Conference on Electric Utility Deregulation and Restructuring and Power Technologies 2000, City University, London; pp. 666-671; 2000.*
Eristi et al.; Wavelet-based feature extraction and selection for classification of power system disturbances using support vector machines; Electric Power Systems Research 80 (2010) 743-752.*

(Continued)

*Primary Examiner* — Hugh Jones
(74) *Attorney, Agent, or Firm* — Gard & Kaslow LLP

(57) ABSTRACT

Waveform analysis is performed to identify and characterize power-consuming devices operating on a building electrical circuit. Current waveforms are measured from the building circuit with electrical devices operating thereon. The waveforms are separated into wavelets and analyzed to identify a representative wavelet model which is transmitted to a server for analysis. The server compares the representative wavelet model to a predictive model built from waveform signatures of known electrical devices operating on a circuit. When the predictive model matches the representative wavelet model, the electrical devices contributing to the representative wavelet, their operating mode(s) (e.g., "on", "off", "paused", "hibernating") and/or their performance state(s) (e.g., normal operation, deterioration, or failure modes) can be identified. This information can be communicated as feedback to the consumer to facilitate more efficient and more cost-effective energy usage.

20 Claims, 12 Drawing Sheets

(56) References Cited

OTHER PUBLICATIONS

Najmeddine et al.; State of art on load monitoring methods; 2nd IEEE International Conference on Power and Energy (PECon 08), Dec. 1-3, 2008, Johor Baharu, Malaysia; pp. 1256-1258.*

Unknown, "Electricity Meter", in Wikipedia (http://web.archive.org/web/20101009030058/http://en.wikipedia.org/wiki/Electricity_meter), archived Oct. 9, 2010, pp. 1-19.

Unknown, "Wavelet", in Wikipedia (http://web.archive.org/web/20101217011849/http://en.wikipedia.org/wiki/Wavelet), archived Dec. 17, 2010, pp. 1-16.

Unknown, "Fourier Transform", in Wikipedia (http://web.archive.org/web/20101215160144/http://en.wikipedia.org/wiki/Fourier_transform), archived Dec. 15, 2010, pp. 1-31.

Unknown, "Frechet Distribution", in Wikipedia (http://en.wikipedia.org/wiki/Fr%C3%A9chet_distribution), accessed Nov. 28, 2011, pp. 1-5.

* cited by examiner

SYSTEM AND METHOD OF WAVEFORM ANALYSIS TO IDENTIFY AND CHARACTERIZE POWER-CONSUMING DEVICES ON ELECTRICAL CIRCUITS

BACKGROUND OF THE INVENTION

1. Field of the Invention

The present invention relates generally to electricity metering, particularly electronic platforms for same.

2. Description of the Prior Art

Metering of electricity is necessary to properly bill consumers of electricity for their electric energy consumption. This metering is typically accomplished through the use of an electricity meter attached to a power line between a building (home, business, or otherwise) and the electric company.

A typical prior art system to measure power consumption is shown in the block diagram of FIG. 1. An electric company 101 provides electricity through a power line 102 to a building 106 through a circuit-breaker panel 105. An electricity meter 103 is connected to power line 102 (typically directly in-line between electric company 101 and building 106) to measure power consumption within/around building 106. Within building 106, the electricity can be accessed by operating an electrical device connected to a power point 108 (e.g., a wall socket) on a building electrical circuit 107 connected to the circuit-breaker panel 105. Building 106 typically contains multiple electrical circuits 107, each with multiple power points 108.

Electricity meters operate by continuously measuring the instantaneous voltage (in volts) and current (in amperes), and then calculating the product of the voltage and current to determine the instantaneous electrical power (in watts). The power can then be integrated over time to determine energy consumption (in joules, kilowatt-hours etc.). Traditional electromechanical meters are now being replaced by electronic smart meters.

Smart meters record consumption of electrical energy, and are rapidly replacing traditional electromechanical meters such as interval or time-of-use meters. Smart meters are attractive to various customer classes (residential, commercial, and industrial) because they can provide features that traditional electricity meters cannot, such as automatic meter reading, real-time or near real-time sensors, power outage notification, remote reporting, and power quality monitoring. In addition, smart meters can communicate information about energy consumption in a two-way wireless communication between the meter and the electric company, thereby facilitating both monitoring and billing. The typical smart meter is limited, however, in that it is designed to calculate only the power consumption (wattage) for an entire structure.

SUMMARY

In one embodiment is a method of characterizing an electrical device comprising: measuring an aggregated waveform from a building electrical circuit, the aggregated waveform resulting from current flow on the building electrical circuit through one or more device connected to the building electrical circuit; determining a representative wavelet model from the aggregated waveform; communicating the representative wavelet model over a network to a server; creating a combined predictive model by combining two or more known waveform signatures, each known waveform signature obtained from a known electrical device; comparing at the server the combined predictive model to the communicated representative wavelet model; and characterizing at least one of the one or more electrical devices connected to the building electrical circuit when the compared combined predictive model and the representative wavelet model match.

In another embodiment is a system to characterize an electrical device connected to a building electrical circuit comprising: an energy monitor configured to connect to the building electrical circuit; measure an aggregated waveform from the building circuit, the aggregated waveform resulting from current flow on the building circuit through one or more device connected to the building circuit; determine a representative wavelet model from the aggregated waveform; and communicate across a communication network; and a server configured to communicate across the communication network with the energy monitor to obtain the representative wavelet model; create a combined predictive model by combining two or more known waveform signatures, each known waveform signature obtained from a known electrical device; compare the combined predictive model to the representative wavelet model; and characterize at least one of the one or more of the electrical devices operating on the building circuit based on a comparison of the combined predictive model with the representative wavelet model.

In yet another embodiment is a non-transitory computer readable storage medium having stored thereupon computing instructions comprising: a code segment to measure an aggregated waveform from a building electrical circuit, the aggregated waveform resulting from current flow on the building electrical circuit through one or more device connected to the building electrical circuit; a code segment to determine a representative wavelet model from the aggregated waveform; a code segment to create a combined predictive model by combining two or more known waveform signatures, each known waveform signature obtained from a known electrical device; a code segment to compare the combined predictive model to the communicated representative wavelet model; and a code segment to characterize at least one of the one or more electrical devices connected to the building electrical circuit when the compared combined predictive model and the representative wavelet model match.

DETAILED DESCRIPTION OF THE INVENTION

The system and method described herein measure from a current flow through a building electrical circuit to which one or more electrical device is connected. The measured current flow is processed to determine a representative model of the current flow through the electrical circuit (a "representative wavelet model"), and the model is then compared against a predictive model (a "combined predictive model") built from waveform signtures from known electrical devices. If the models match, the one or more electrical devices connected to that building circuit can be characterized to identify the electrical device(s) operating on the electrical circuit, its/their operating mode, and/or its/their performance state. This information can be used to manage building energy usage, minimize energy costs, and detect failing components of electrical device failures (thereby allowing maintenance, repair, and/or component replacement before a more costly device failure event).

Figure 1:
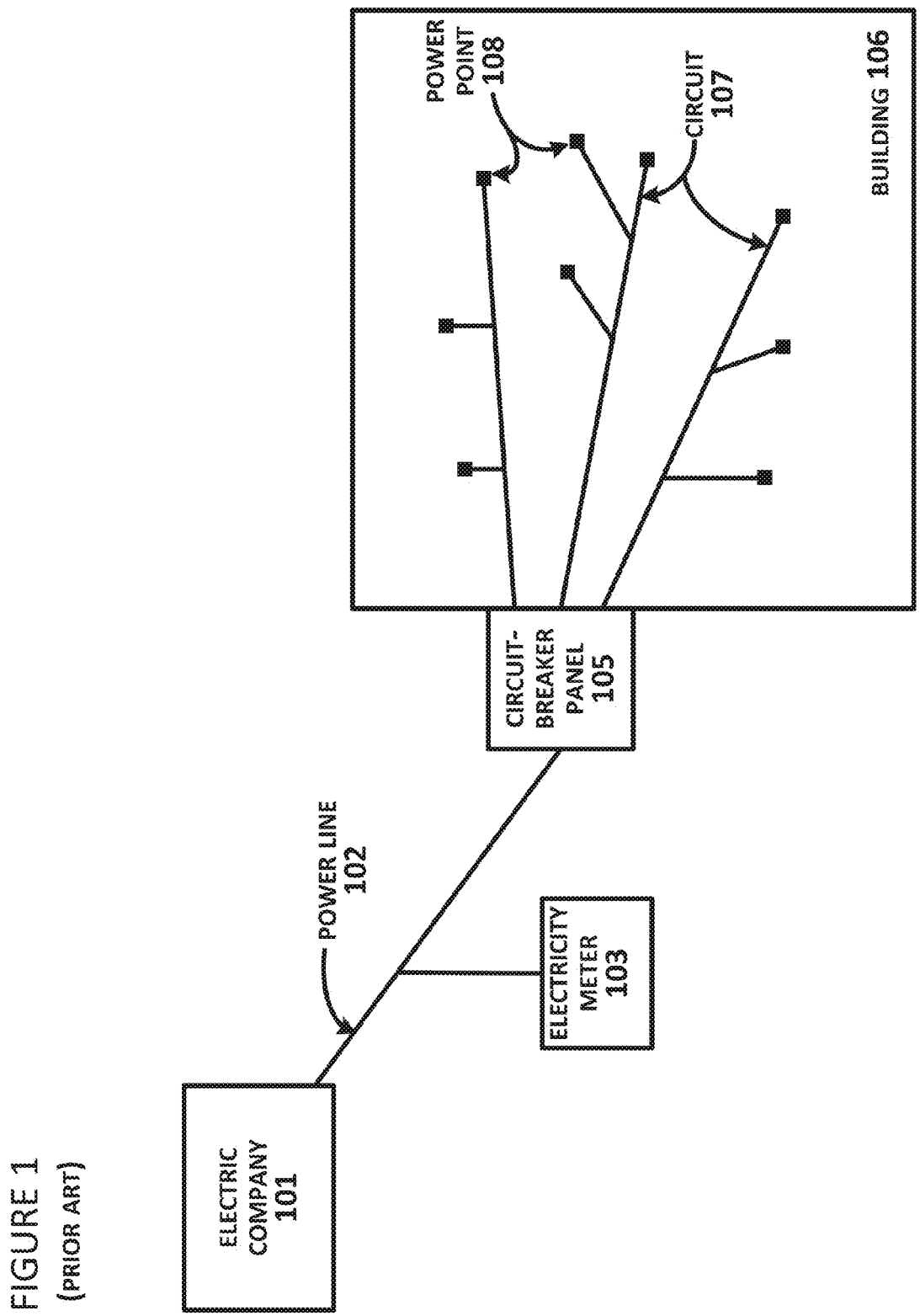
FIG. 1 is a block diagram depicting a prior art system for providing and metering electricity to a building.
Figure 2:
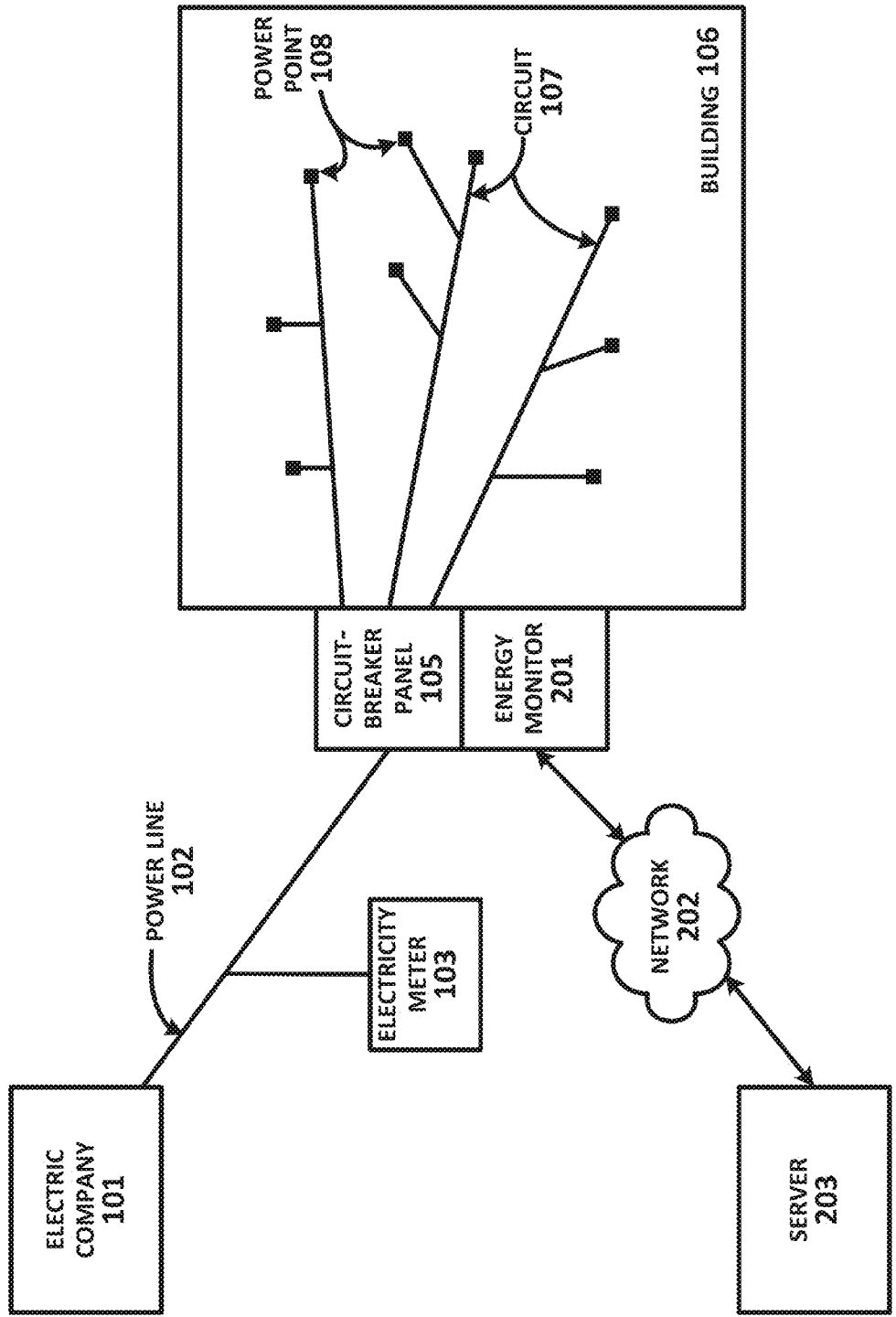
FIG. 2 is a block diagram depicting a system for waveform analysis to identify and characterize electrical devices on a building electrical circuit according to one embodiment.

A block diagram of one embodiment of the system for waveform analysis to identify the device(s) consuming power within the building and to determine operating mode and performance state of the device(s) is shown in FIG. 2. As shown in the figure, energy monitor 201 is coupled to power line 102 (preferably within circuit-breaker panel 105), to one or more building electrical circuit 107 (preferably within circuit-breaker panel 105), and to a server 203 (through a network 202). One of skill in the art will understand that energy monitor 201 can instead connect to power line 102 and/or one or more building electrical circuit 107 at some location outside circuit-breaker panel 105.

Energy monitor 201 measures an aggregated waveform (a waveform composed of individual current waveforms from one or more electrical devices operating on a building electrical circuit 107), processes the aggregated waveform, and constructs a representative wavelet model of the aggregated waveform.

Energy monitor 201 is in communication with server 203 through network 202. Server 203 comprises a database of known waveform signatures (i.e., waveform signatures from known electrical devices). The known waveform signatures for an electrical device are wavelets from waveforms that were previously captured from recorded instances of the known electrical device operating alone on a building electrical circuit 107 with no other electrical devices operating on the circuit. The known waveform signatures can have been captured previously from this building electrical circuit 107 and/or captured previously from some other building electrical circuit 107. Once captured, the waveform signatures were stored in the database. Thus, the database contains multiple samples of the known waveform signatures captured over time for each of a variety of electrical devices. The database can also contain averaged known waveform signatures (i.e., averages of wavelets measured over time) for any of the variety of known electrical devices.

In one embodiment, the database also contains known waveform signatures of individual electrical devices in various operating modes (e.g., "on", "off", "paused", and "hibernating") and/or known waveform signatures of individual electrical devices operating in different performance states (e.g., normal operation, deterioration, or failure modes). In another embodiment, the database contains known combinations of one or more known waveform signatures (e.g., a known waveform signature obtained from a building electrical circuit 107 on which an air conditioner, an oven, and a clothes dryer are operating simultaneously) accumulated from recorded instances of the known combination of known electrical devices operating simultaneously on a building electrical circuit 107 with no other electrical devices operating on the circuit.

Server 203 obtains the representative wavelet model from energy monitor 201. Server 203 constructs the combined predictive model and compares the combined predictive model to the representative wavelet model. Based on the results of the comparison, server 203 can identify the device(s) coupled to building electrical circuit 107, as well as the operating mode(s) of the identified device(s) and/or the performance state(s) of the identified device(s). One of skill in the art will understand that server 203 can run on one or more physical machine, one or more software module, or on cloud-computing services.

Communication across network 202 is preferably governed by cellular wireless standards (e.g., 3G or 4G). One of ordinary skill in the art will further understand that network 202 can be the internet, a wide area network (WAN), a local area network (LAN), a global area network (GAN), a virtual private network (VPN), a personal area network (PAN), an enterprise private network, or any similar network now known or later developed. One of ordinary skill in the art will further understand that known network connections include an integrated services digital network (ISDN), a broadband ISDN (B-ISDN), a digital subscriber line (ADSL, ADSL+2), a symmetric digital subscriber line (SDSL), a very high speed DSL (VDSL), cable, wireless, a broadband internet connection, a T-1 line, a bonded T-1 line, a T-3 line, an optical carrier level 3 (OC3), a satellite, or any other form of network connection now known or later developed.

Figure 3:
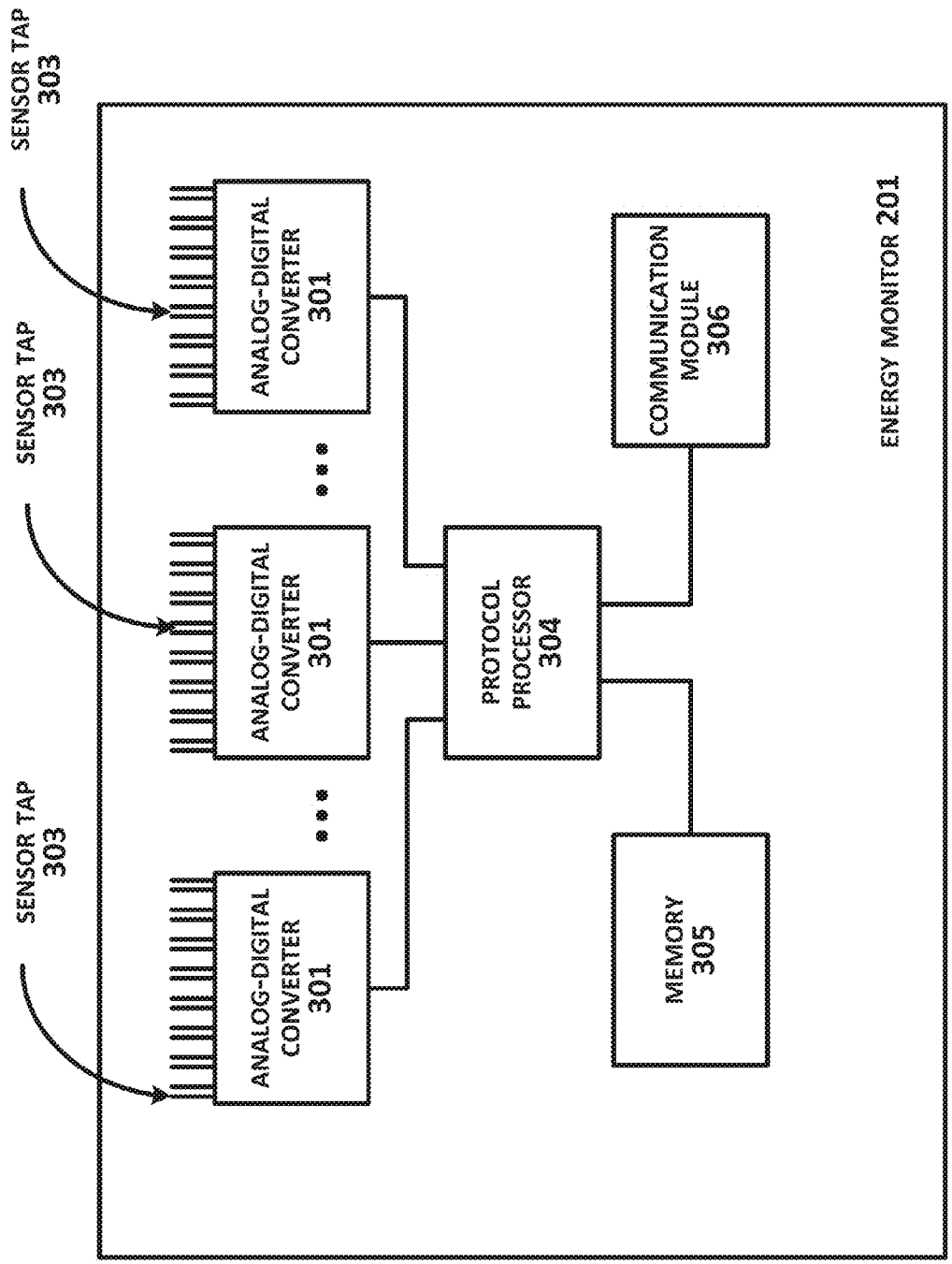
FIG. 3 is a block diagram of an energy monitor of the system and method according to one embodiment.

Referring now to FIG. 3, a block diagram of one embodiment of energy monitor 201 is shown. Energy monitor 201 comprises multiple (e.g., up to eight) analog-to-digital converters (ADCs) 301 (e.g., MAX11040K 24-bit ADC), a protocol processor 304 (e.g., 1 GHz TI DM3730 such as TI OMAP 1 Ghz ARM Cortex A8), memory 305, and a communication module 306 (e.g., CINTERION PH8 M2M module). Each ADC comprises multiple (e.g., up to eight) dual-channel sensor taps 303 and a central processing unit with processing logic (not shown).

ADC 301 is coupled to a building electrical circuit 107 via sensor tap 303 to record, denoise, and digitize current and voltage waveforms passing through building electrical circuit 107 (discussed below in greater detail with respect to FIG. 6). Denoised and digitized waveform signals are then passed to protocol processor 304 for separation into wavelets and determination of the representative wavelet model. Once the representative wavelet model has been determined, protocol processor 304 can pass the representative wavelet model to communication module 306 for transmission over network 202 to server 203 for further analysis (discussed below in greater detail with respect to FIG. 7).

Figure 4:
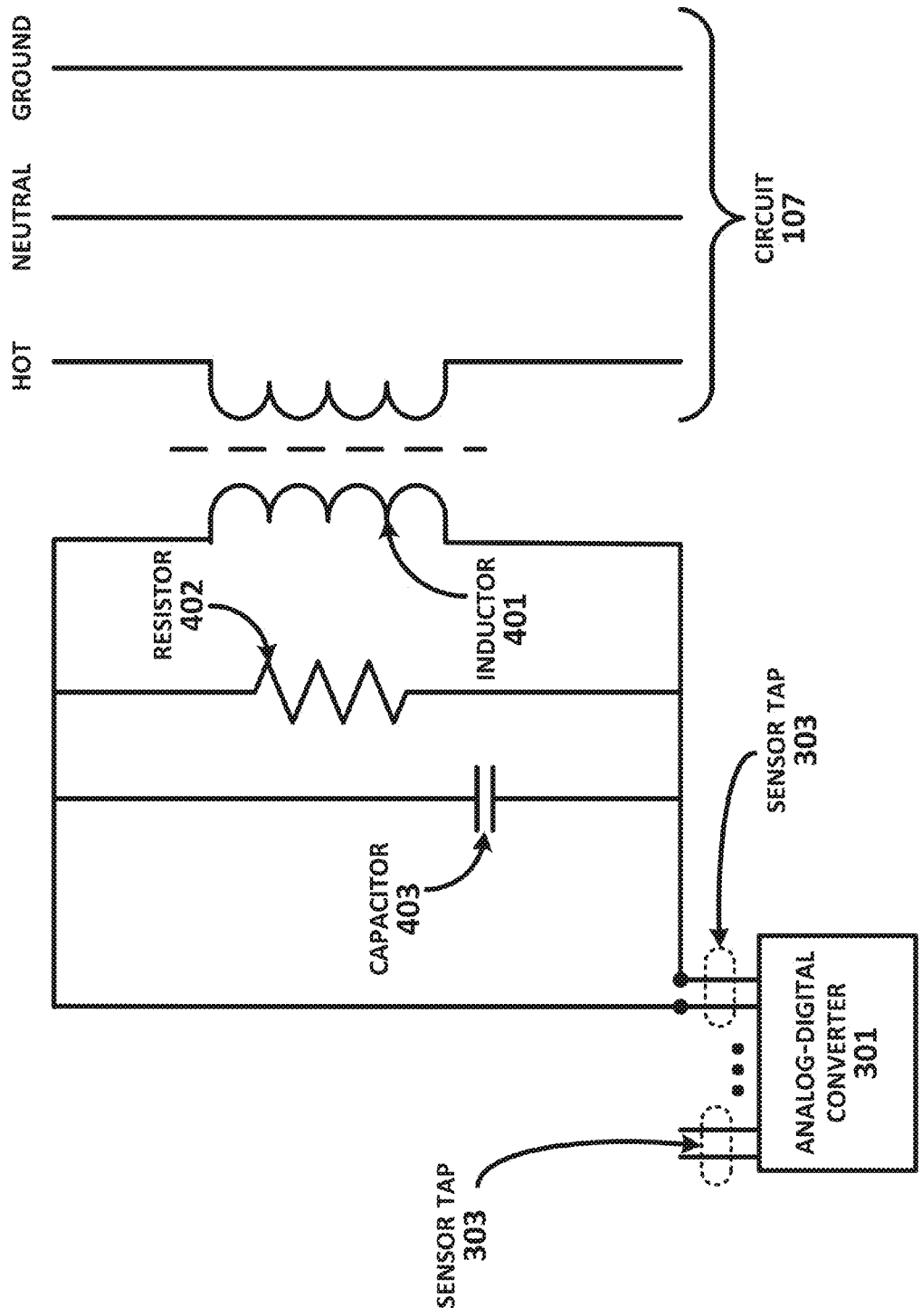
FIG. 4 is an electrical circuit diagram illustrating how current from the building electrical circuit is measured by the energy monitor according to one embodiment.

FIG. 4 is an electrical circuit diagram illustrating how the current of a building electrical circuit 107 is measured by ADC 301 of energy monitor 201 according to one embodiment. ADC 301 measures current from building electrical circuit 107, preferably using a current transformer (CT) clamp applied to building electrical circuit 107 and coupled to sensor tap 303 of ADC 301. As is known, resistor 402 and capacitor 403 stabilize and filter noise from the measured waveform before the waveform is passed through sensor tap 303 of ADC 301. ADC 301 then denoises and digitizes this input from sensor tap 303.

Figure 5:
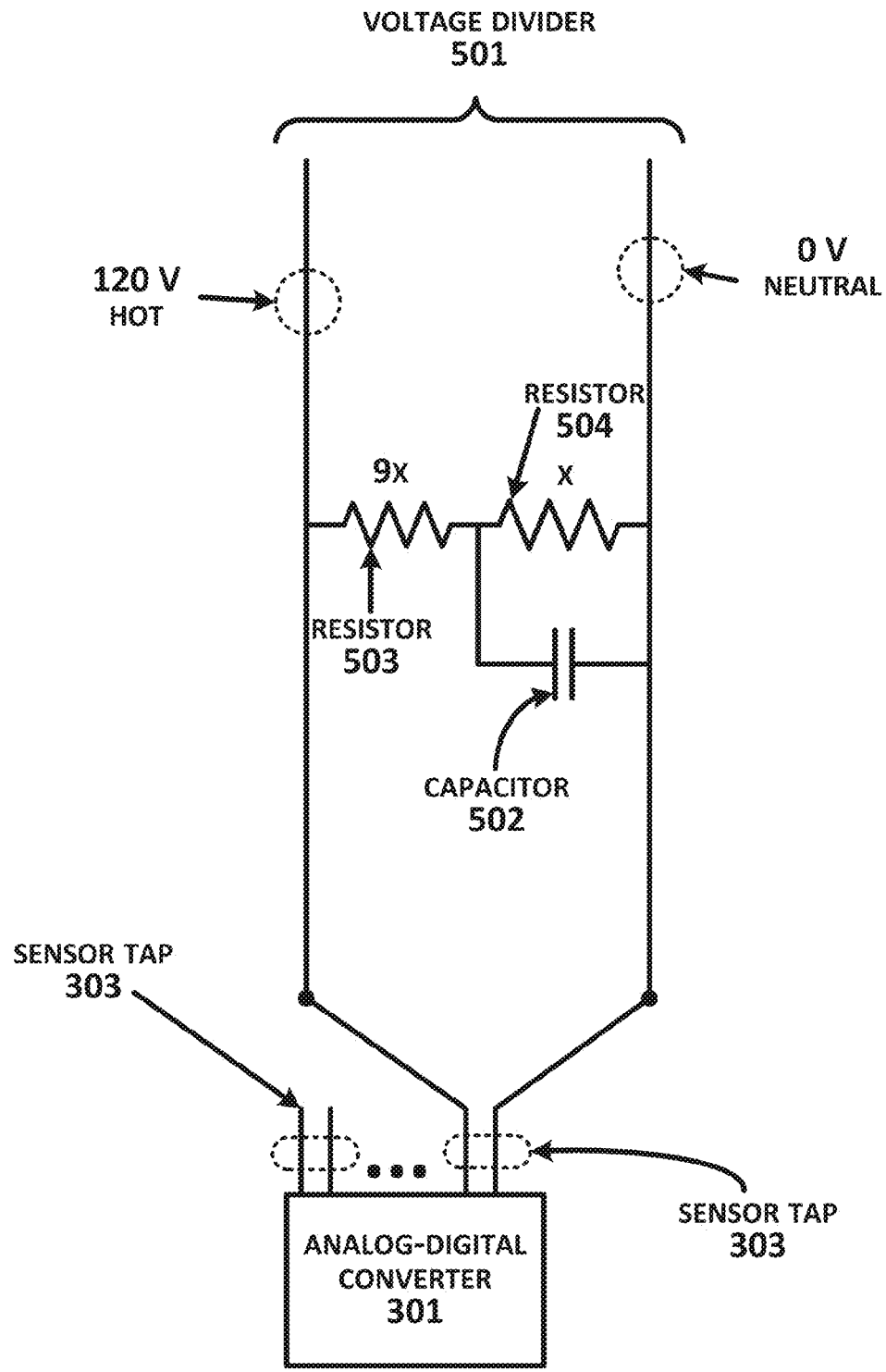
FIG. 5 is an electrical circuit diagram illustrating use of a voltage divider to measure voltage of the building electrical circuit according to one embodiment.

Referring now to FIG. 5, a voltage divider 501 is used to measure voltage of the building electrical circuit 107. As is known, the voltage divider consists of two resisters in series (resistor 503 and resistor 504) connected to capacitor 502, which circuit acts to step down the voltage as it passes from the hot wire through sensor taps 303 to ADC 301 and thereby protect ADC 301 from excessive voltage. Voltage from voltage divider 501 is passed through one dual-channel sensor tap 303 per energy monitor 201 to be used as a stable reference voltage so measured current waveforms can be held in phase. As is known, waveform phase is aligned by calculating Real Power (e.g., $\Sigma I(t)*V(t)$ over the 128 index points per cycle), Apparent Power ($\sqrt{\Sigma I(t)^2} * \sqrt{\Sigma V(t)^2}$), and a Power Factor (Real Power/Apparent Power) to determine the phase angle of the offset between the voltage and current ($\cos^{-1}$(Power Factor)) to be corrected.

Figure 6:
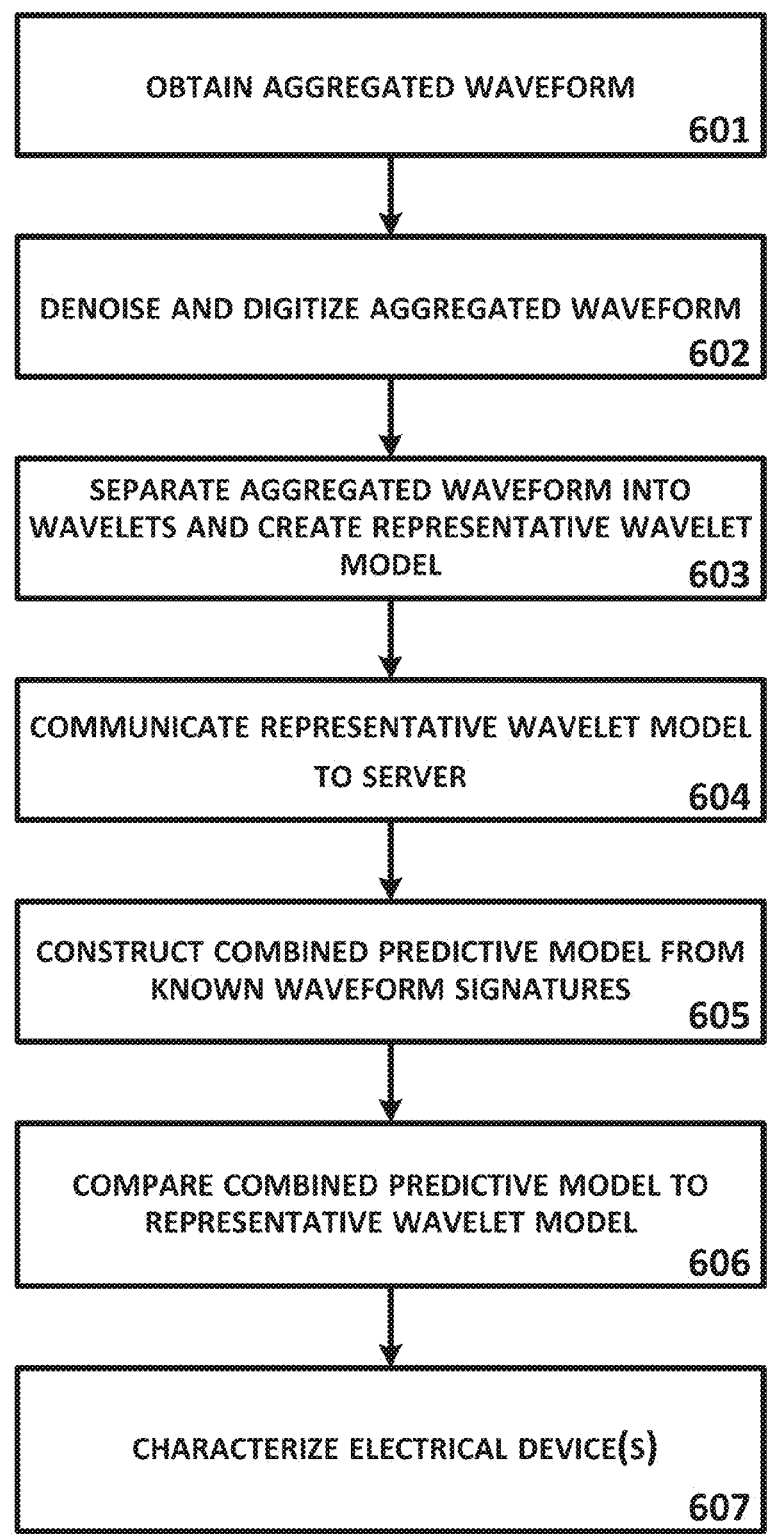
FIG. 6 is a flowchart detailing the method of characterizing electrical devices on a building electrical circuit according to one embodiment.

One embodiment of the method of analyzing current waveforms from a building electrical circuit to identify and characterize power-consuming devices on that circuit is detailed in the flowchart of FIG. 6. In step 601, an aggregated current waveform from a building electrical circuit 107 is obtained. The aggregated current waveform is a waveform composed of individual current waveforms from one or more electrical devices operating on a building electrical circuit 107. In one embodiment, ADC 301 obtains the aggregated current waveform.

In step 602, the 0 voltage crossing of the aggregated current waveform is determined to define a cycle of the aggregated current waveform. The aggregated current waveform is then denoised to get the fundamental aggregated current waveform for the cycle. The denoised aggregated current waveform is then digitized before passing the digitized and denoised aggregated current waveform to protocol processor 304. In one embodiment, ADC 301 determines the 0 voltage crossing to define the cycle of the aggregated current waveform and then denoises and digitizes the aggregated current waveform.

In step 603, the digitized and denoised aggregated current waveform is separated into wavelets, each wavelet comprising one cycle of the digitized and denoised aggregated current waveform. Each wavelet consists of 128 wavelet indices per cycle (i.e., current measurements at 128 time points throughout the wavelet). A representative wavelet model is created through the following procedure. Sample wavelets (e.g., 20 wavelets) are captured from the aggregated current waveform to create a model data set containing the 128 indices for each wavelet in the sample. The mean current and standard deviation are then calculated for each of the 128 indices of the sample wavelets in the model data set. These 128 means and standard deviations for the wavelet comprise a representative wavelet model. Once created, the representative wavelet model is stored in memory 305. In one embodiment, protocol processor 304 performs these processes of step 603.

As additional digitized and denoised aggregated current waveforms are streamed (preferably from ADC 301), the incoming digitized and denoised aggregated current waveform is separated into incoming wavelets and compared to the representative wavelet model. If the 128 indices for the incoming wavelet are within 3 standard deviations of the 128 mean indices of the representative wavelet model, then the incoming wavelet is considered to fit the representative wavelet model. In that case, data from the incoming wavelet is added to the model data set, and the means and the standard deviations for each of the 128 indices in the model data set are re-calculated, thereby updating the representative wavelet model. The updated model replaces the previously stored model as the representative wavelet model in memory 305. In one embodiment, protocol processor 304 performs these processes of step 603.

If the incoming wavelet does not fit the representative wavelet model (i.e., some or all of the 128 indices for the incoming wavelet are greater than 3 standards deviations from the mean indices of the representative wavelet model), then the device load on the monitored building electrical circuit is assumed to have changed, so data from the incoming wavelet are not added to the model data set. Instead, the wavelet not matching the representative wavelet model can be used as the first wavelet for the creation of a new model data set for another representative wavelet model (i.e., the first sample wavelet in a new data set) to be created as discussed above. Specifically, succeeding incoming sample wavelets are added to the new model data set and the means and standard deviations for each of the 128 indices of the sample wavelets in the new model data set are calculated to comprise the new representative wavelet model. In one embodiment, protocol processor 304 performs these processes of step 603.

In one embodiment, whether the incoming wavelet matches the representative wavelet model can be determined by analyzing transition edges between wavelets ("edge events"). As device load on a building electrical circuit 107 changes (e.g., electrical devices are added to or removed from building electrical circuit 107 or electrical devices are turned on or off), alternating current is affected by electrical properties (e.g., inductance and capacitance) not observed under steady-state direct current. When circuitry is subjected to transients (e.g., as when first energized), these electrical properties can affect the edge event of several successive sequential wavelets (e.g., 3 or 4) such that the edge events can be distinguished by their differing decay rates. Once a steady-state is achieved on the building electrical circuit, the edge event stabilizes such that successive wavelets cannot be distinguished by edge events. Thus, if the incoming wavelet edge event does not match the edge event for the representative wavelet model, the incoming wavelet does not match the representative wavelet model so data for the incoming wavelet are not added to the model data set from which the representative wavelet model is determined.

In this embodiment, an assumption is made that a steady-circuit edge event (i.e., a wavelet edge event if no electrical devices are added or removed from the circuit) will remain static across successive wavelets. Incoming wavelets are monitored and used to supplement the representative wavelet model with data from incoming wavelets as long as the edge event is static. If the edge event for the incoming wavelet changes (i.e., an aberrant edge event is detected), then the aberrant edge event is analyzed to determine whether something changed internally (within the circuit being monitored), or whether the aberrant edge event reflects external transient signal unrelated to the circuit being monitored.

Because certain electrical devices can take several seconds, (or even minutes) to fully ramp up, a rolling window (e.g., approximately 1 second) of current waveform measurements (e.g., mean and standard deviation) is monitored during edge events. This rolling window is used to determine when the edge event waveform pattern breaks from the steady state edge event of the representative wavelet model (i.e. to determine when the edge event becomes aberrant).

Once the aberrant edge event is detected, the aberrant edge event is monitored to determine when the waveform stabilizes back into the steady-state (e.g., the mean and standard deviation of the edge event matches a successive waveform edge event). Once the successive edge events match, the aberrant edge event is considered to be complete and the mean and standard deviation of that aberrant edge event is compared to the mean and standard deviation of the edge event for the representative wavelet model. If the aberrant edge event matches the edge event for the representative wavelet model, then the aberrant edge event is likely transient noise external to the circuit being monitored, so data from wavelets with the aberrant edge event are discarded (instead of being added to the model data set) to avoid contaminating the representative wavelet model.

If the aberrant edge event does not match the edge event for the representative wavelet model, the aberrant edge event was likely caused by a change on the building electrical circuit being monitored (e.g., a new electrical device added to building electrical circuit 107 or an electrical device removed from building electrical circuit 107), so collection of data for the previously created (and updated) representative wavelet model is terminated. Collection of wavelet data for a new model data set for another representative wavelet model can begin once the longer edge event becomes a steady-circuit edge event.

In one embodiment, protocol processor 304 performs these edge event analyses of step 603.

In step 604, the representative wavelet model is communicated to an apparatus for comparison analysis. In one embodiment, the representative wavelet model is retrieved from memory 305 and conveyed to communication module 306 which, in turn, transmits the representative wavelet model across network 202 to server 203 to be used as the representative wavelet model for a comparison analysis. The representative wavelet model is a set of mean current measurements and standard deviations for each of the 128 indices of the representative wavelet. The representative wavelet model data can be data-compressed (e.g., via bit-rate reduction) using known data compression techniques before transmission to server 203. The representative wavelet model can be transmitted hourly or daily during scheduled synchronization of communication module 306 with server 203, or transmission may be continuous as representative wavelet models are created. In one embodiment, protocol processor 304 retrieves the representative wavelet model from memory 305 and conveys the representative wavelet model to communication module 306 for communication to server 203.

In step 605, the combined predictive model of the one or more electrical device on building electrical circuit 107 is constructed by adding together one or more known waveform signatures. In one embodiment, the combined predictive model can comprise a single known waveform signature. In another embodiment, server 203 uses knowledge of a previous state of building electrical circuit 107 (e.g., which device(s) was/were connected to building electrical circuit 107) to select known waveform signatures to comprise the generated combined predictive model. In yet another embodiment, the database contains information about wavelet edge events of the stored known waveform signatures which edge event information can be used to facilitate identification of which known waveform signatures to combine. In one embodiment, server 203 constructs the combined predictive model of the one or more electrical device on building electrical circuit 107 by adding together one or more known waveform signature stored in server 203.

Waveform signatures can be classified to identify/organize likely predictive waveform signatures for inclusion in the combined predictive model. In one embodiment, edge detection techniques can be used to characterize the representative wavelet model before selecting known waveform signatures with similar edge events for inclusion in the combined predictive model. Because edge events differ among devices and/or device classes, the edge event can also be used to focus waveform signature selection when building the combined predictive model.

Figure 9:
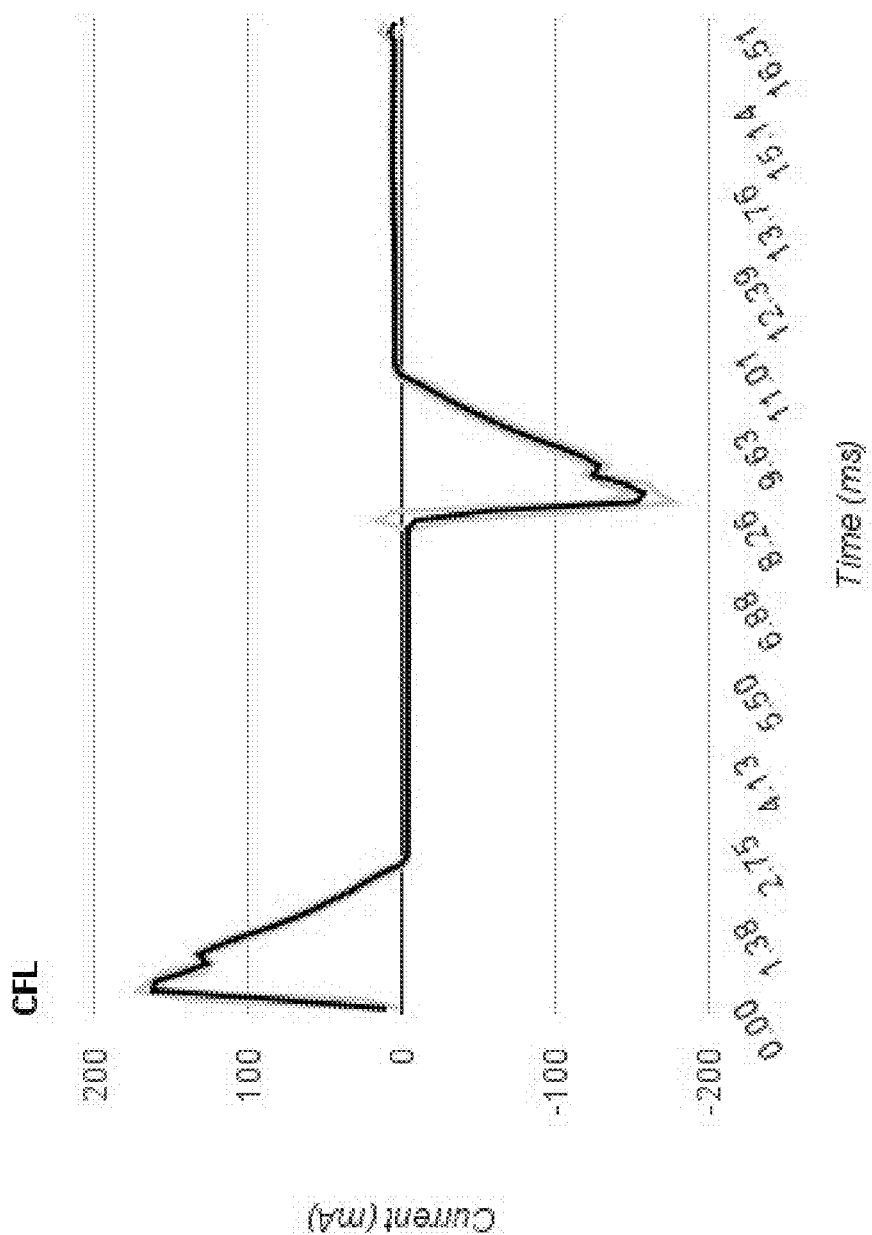
FIG. 9 shows a known waveform signature for a compact fluorescent lighting device captured from a building electrical circuit to which only the compact fluorescent lighting device is connected.
Figure 10:
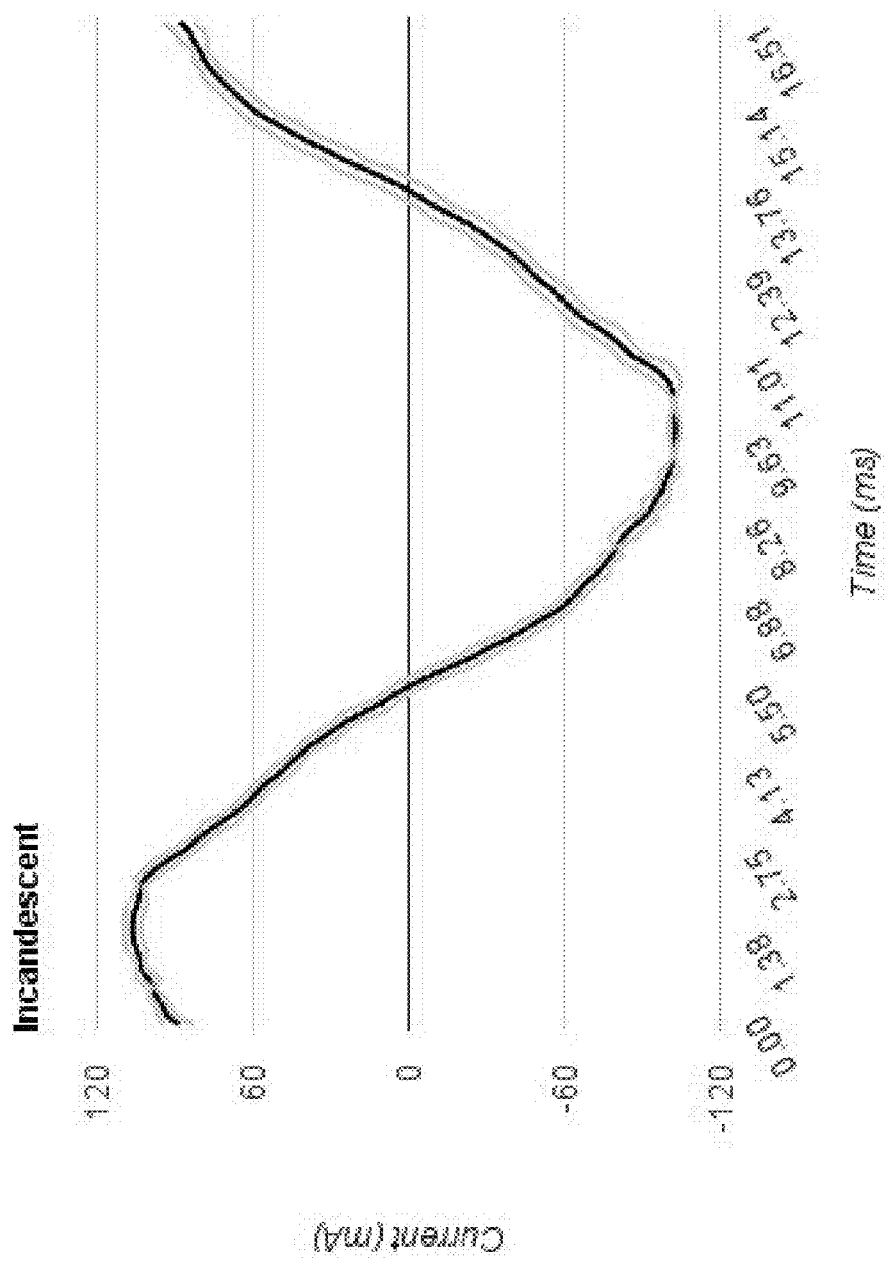
FIG. 10 shows a known waveform signature for an incandescent light source device captured from a building electrical circuit to which only the incandescent light source device is connected.

Creation of an exemplary combined predictive model will now be described with reference to FIGS. 9, 10, and 11. Examples of known waveform signatures are shown in FIG. 9 (for a compact fluorescent lighting device) and in FIG. 10 (for an incandescent light source device). The waveforms were captured from an electrical circuit to which only the compact fluorescent lighting device was connected (FIG. 9) and from an electrical circuit to which only the incandescent light source device was connected (FIG. 10). Multiple wavelets were captured and averaged to obtain the mean known waveform signature (darkly shaded line) and standard deviation (lightly shaded line) shown in each figure. The known waveform signatures for the two devices are combined (additively) to create the combined predictive model shown in FIG. 11.

Returning now to FIG. 6, in step 606, server 203 compares the combined predictive model is compared to the representative wavelet model to determine whether the models match (as described in greater detail with respect to FIG. 7 below). In one embodiment, server 203 compares the combined predictive model to the representative wavelet model to determine whether the models match. If no match is found, the process flow loops back to step 605 and server 203 creates a new combination of known waveform signatures (e.g., by selecting a single known waveform signature or by adding known waveform signatures together). Server 203 then compares that new combined predictive model against the representative wavelet model in step 606.

In one embodiment, this iterative process continues until all reasonable combined predictive models (e.g., comprising 20 or fewer known waveform signatures) have been exhausted. If multiple models match, the model with the lowest aggregate Z-score (e.g., the lowest number of standard deviations from the mean) across the 128 sample points.

If no match is found, the representative wavelet model is considered to be an unidentified waveform signature. This unidentified waveform signature can be identified manually and then added to the database as a new known waveform signature.

If, in step 606, server 203 finds a match between the combined predictive model and the representative wavelet model, then, in step 607, the electrical device(s) on building electrical circuit 107 are characterized (as discussed in greater detail below with respect to FIG. 7). In one embodiment, server 203 characterizes the electrical devices.

Figure 7:
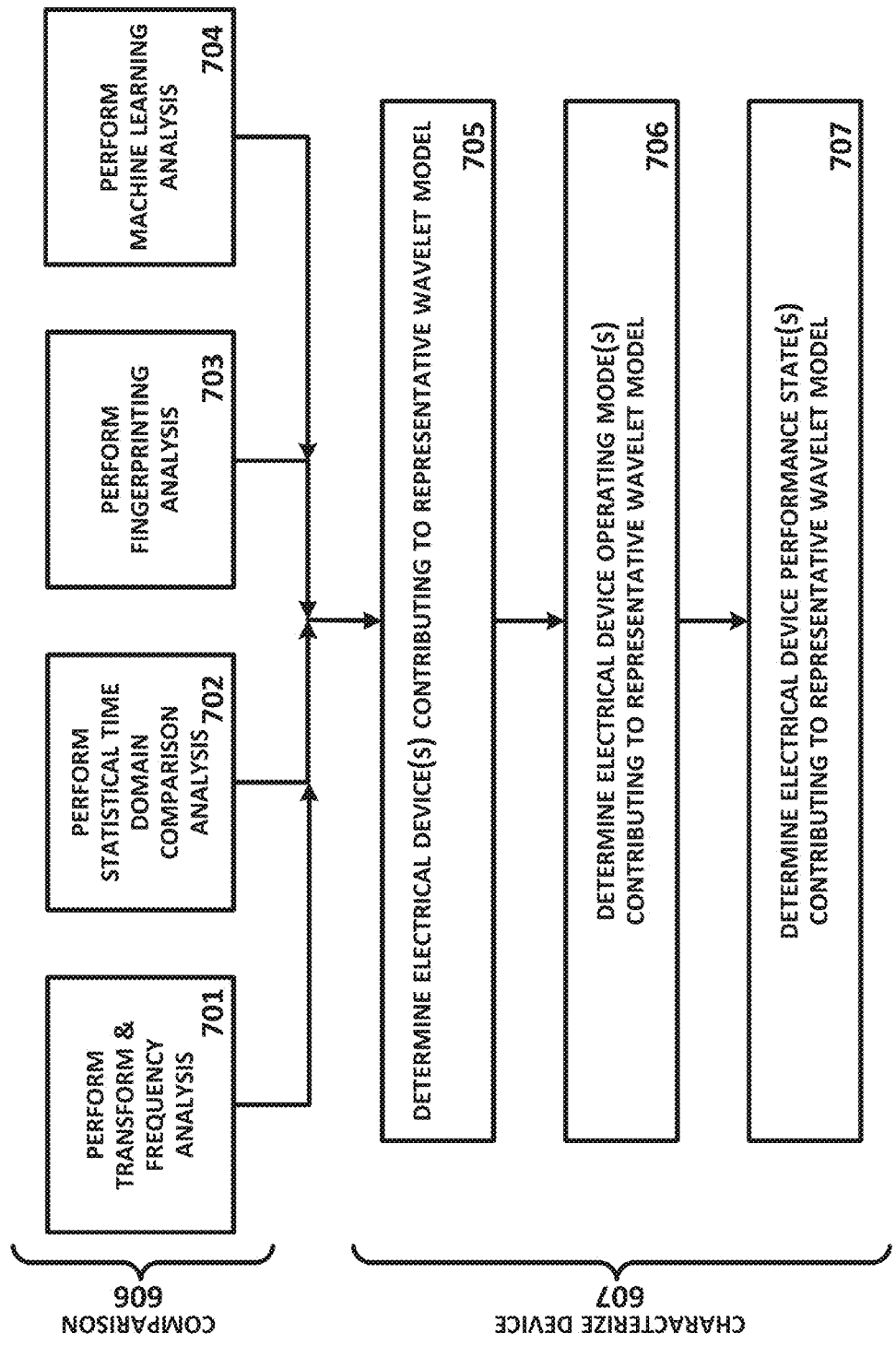
FIG. 7 is a block diagram detailing how representative wavelets are compared to combined predictive models to identify and characterize devices on a building electrical circuit according to one embodiment.

Referring now to FIG. 7, a block diagram of the model comparison process (outlined above with respect to step 606 of FIG. 6) and device characterization process (outlined above with respect to step 607 of FIG. 6) is shown.

The combined predictive model and the representative wavelet model can be compared using one or more known analysis techniques, including a transform and frequency analysis 701, a statistical time domain comparison 702, a fingerprinting analysis 703, and/or a machine learning analysis 704. One or more of these analyses can be performed serially or in parallel to compare the representative wavelet model with the combined predictive model. Preferably, all four analyses are performed to determine whether the combined predictive model matches the representative wavelet model. If the combined predictive model and the representative wavelet model match, then the known waveform signature(s) comprising the combined predictive model identify the device(s) operating on building electrical circuit 107.

Because the resistance, capacitance, and inductance of electrical devices differ, combinations of electrical devices can be distinguished by determining through transform and frequency analysis 701 which harmonics of the 60 Hz alternating current (AC) power waveform are or are not amplified. In one embodiment, a Fast Fourier Transform (FFT) is applied to the representative wavelet model and to the combined predictive model to calculate the respective discrete Fourier transforms separating a sequence of current values into components of different frequencies. The magnitude of each device harmonic in the combined predictive model is then compared to the corresponding peak in the representative wavelet model by comparing the root mean squared (RMS) of the difference in magnitudes of the spectral peaks of the two models. If the magnitude of the spectral peaks obtained from FFT analysis of the combined predictive model match the magnitude of the spectral peaks obtained from FFT analysis of the representative wavelet model (i.e., if the RMS exceeds a predetermined threshold), then the combined predictive model matches the representative wavelet model, which means that the electrical device(s) operating on building electrical circuit 107 can be identified by the combined predictive model. If the distance between spectral peaks for the two models is large, then the combined predictive model does not match the representative wavelet model, which means that the electrical device(s) operating on building electrical circuit 107 cannot be accurately identified by the combined predictive model.

Figure 8:
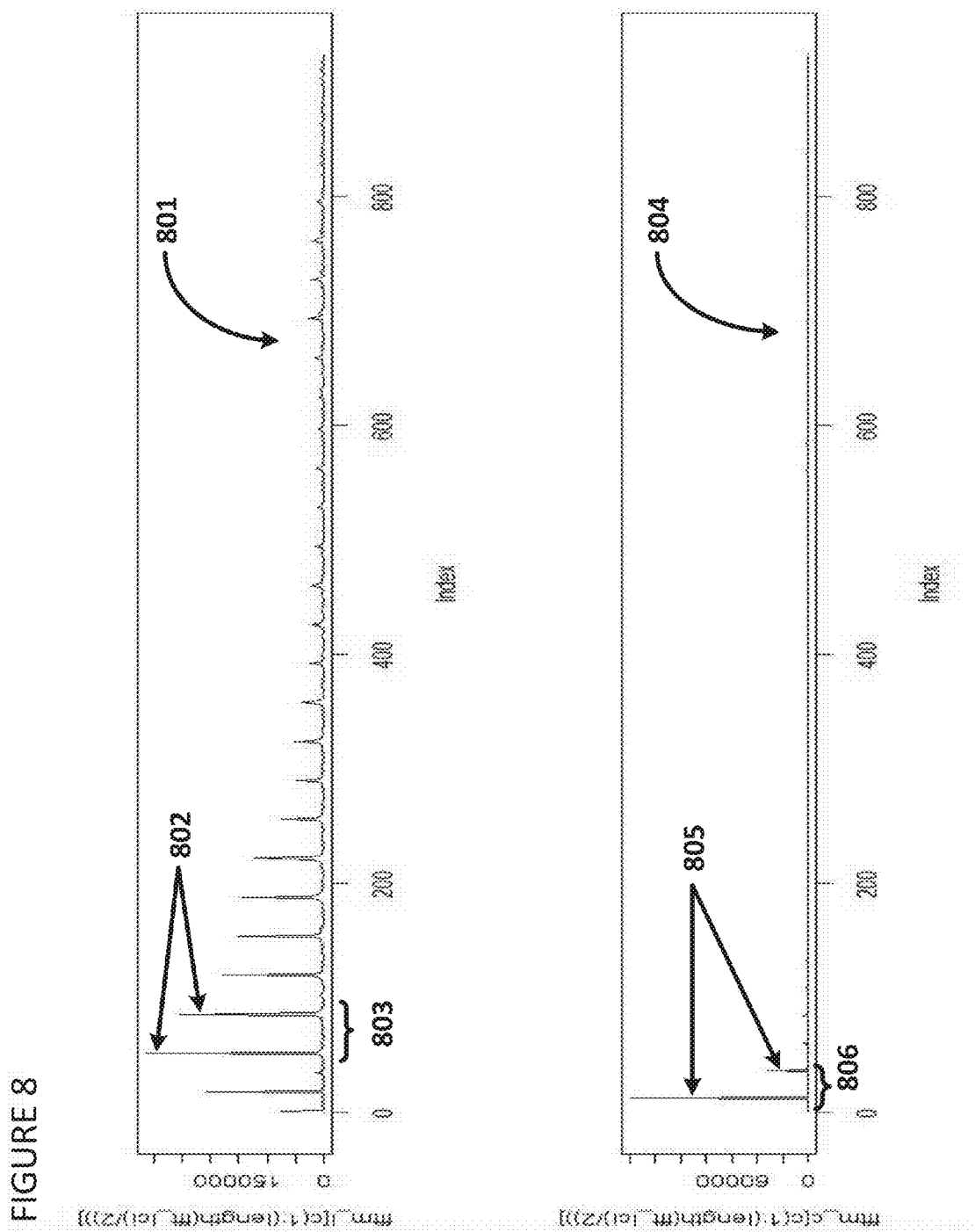
FIG. 8 illustrates exemplary resonant peaks (captured at each harmonic of input power supply) obtained from a transform and frequency analysis performed on current waveforms from two electrical devices on a building electrical circuit.

FIG. 8 shows two examples of the FFTs generated from known waveform signatures: an FFT for a liquid crystal display (LCD) 801 and an FFT for hair clippers 804. Resonant LCD peaks 802 and resonant hair clipper peaks 805 were captured at each harmonic of input power supply. LCDs (but not hair clippers) contain a current and voltage ballast due to inductive and capacitive elements in an LCD AC adaptor, and therefore resonate at higher multiples of a 60 Hz power signal when compared to hair clippers (which have more of an inductive load). This difference is reflected as a greater magnitude of LCD resonant peaks 803 (captured at each harmonic of input power supply) compared to the magnitude of hair clipper resonant peaks 806 (captured at each harmonic of input power supply). This difference indicates that the electrical device (the LCD) generating the data analyzed in 801 is different from the electrical device generating the data analyzed in 804 (the hair clippers).

Referring back to FIG. 7, statistical time domain comparison analysis 702 compares the two models using z-scores. Specifically, the individual waveform signatures comprising the combined predictive model are summed to generate a data point for each of the 128 indices of the combined predictive model. Those 128 data points of the combined predictive model are then compared to the respective means and standard deviations of the 128 indices of the representative wavelet model (i.e., the data point for index 1 of the combined predictive model is compared to mean of index 1 of the representative wavelet model) to determine z-scores (i.e., the difference between each of the indices of the two models expressed as standard deviations from the mean indices of the representative wavelet model). The RMS of the z-scores across the 128 indices is then calculated. The RMS of the pairwise differences of the two models can serve as a measure of how far (on average) the error is from 0. A larger RMS indicates that the combined predictive model does not match the representative wavelet model, whereas a RMS close to 0 indicates that the combined predictive model closely approximates the representative wavelet model.

Figure 11:
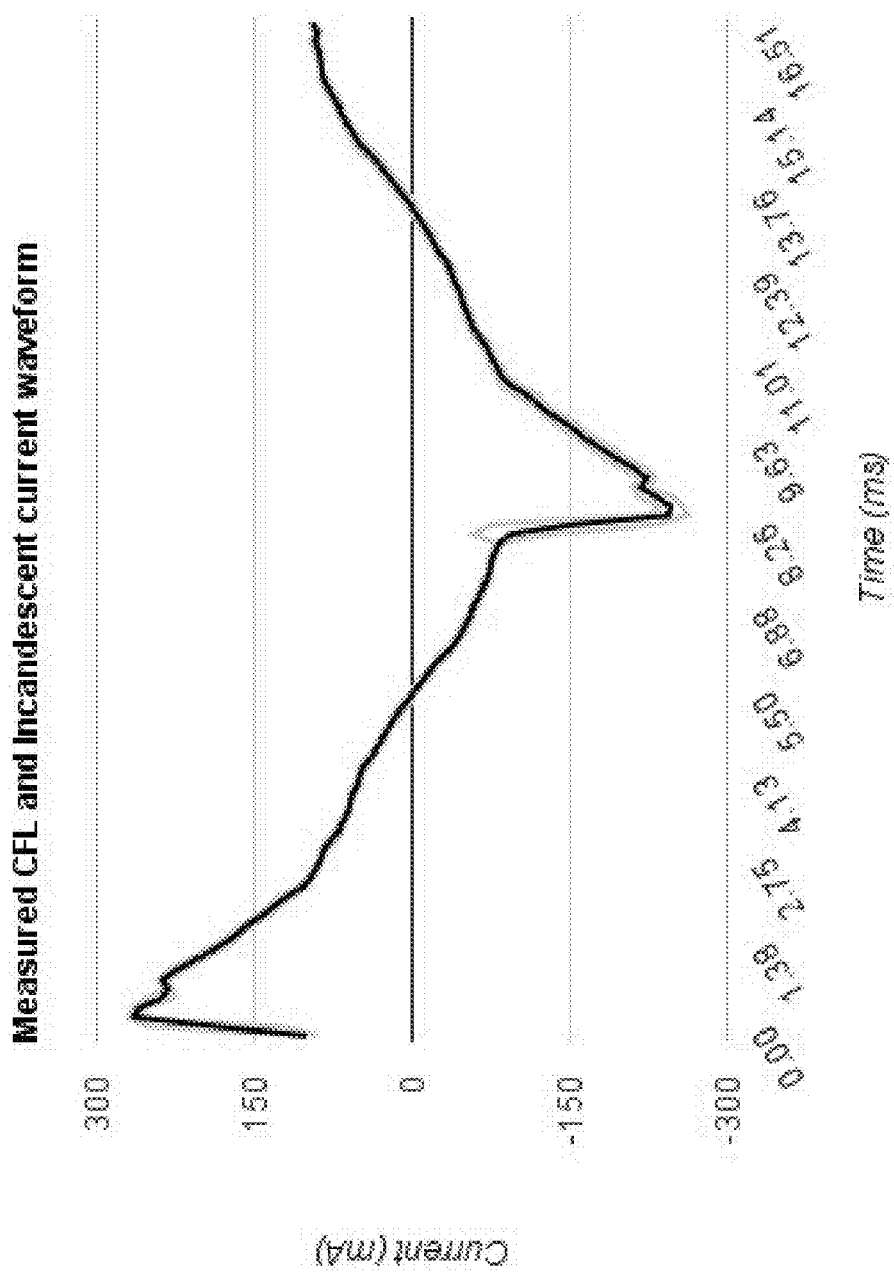
FIG. 11 shows a measured representative wavelet captured from a building electrical circuit connected to which only one compact fluorescent lighting device and one incandescent light source device are connected.
Figure 12:
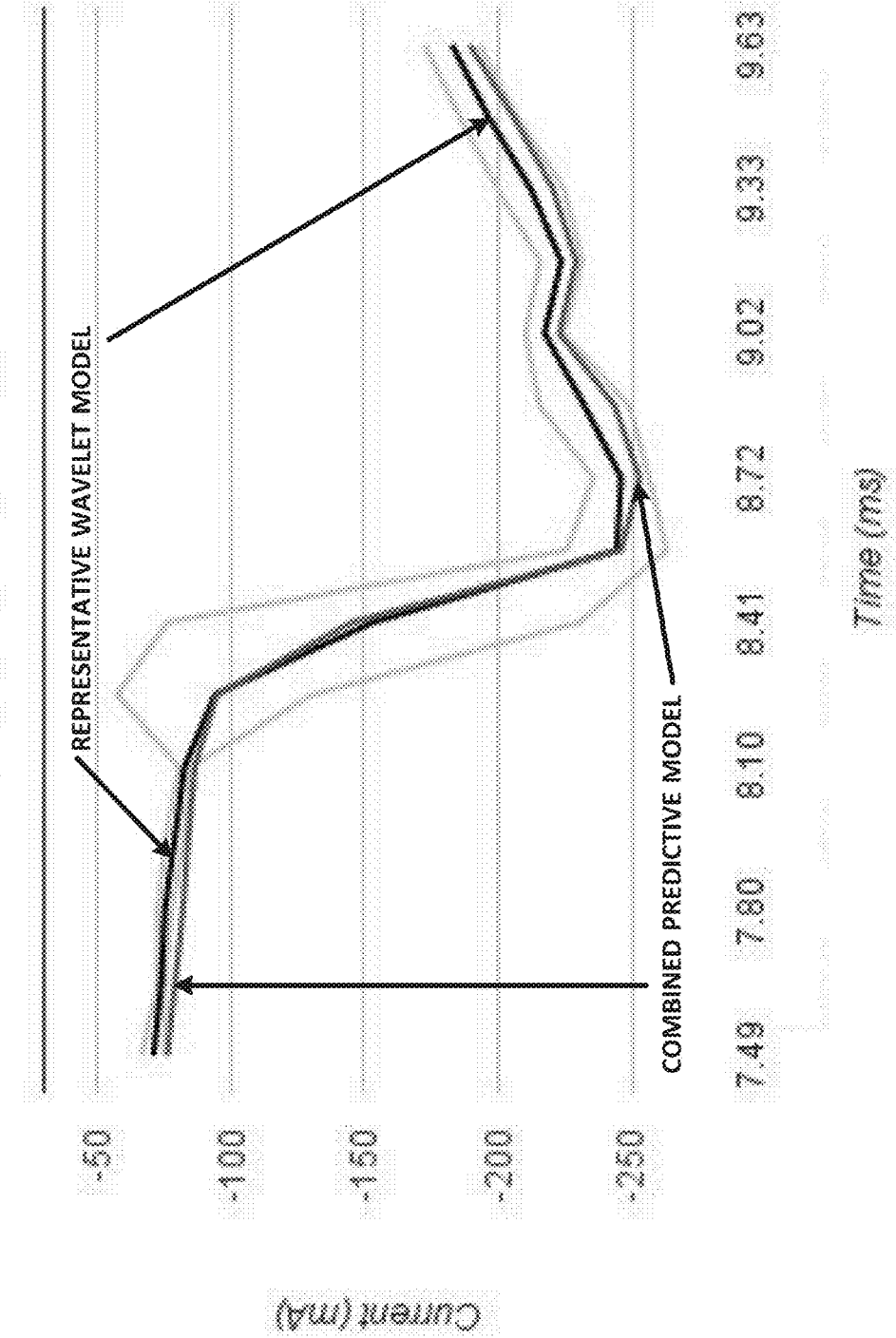
FIG. 12 shows a comparison between the combined predictive model (created by combining current waveform signatures from one compact fluorescent lighting device and one incandescent light source device) and the representative wavelet model.

FIG. 12 shows the exemplar combined predictive model shown in FIG. 11 (created by combining current waveform signatures from one compact fluorescent lighting device and one incandescent light source device) superimposed on the representative wavelet model obtained from building electrical circuit 107.

The combined predictive model (the lower darkly shaded line) closely matches the representative wavelet model (indicated by the upper darkly shaded line, with the upper/lower standard deviations indicated by the lightly shaded line). A comparison of z-scores across time (i.e., across the 128 indices) generates z-scores close to 0, indicating that the combined predictive model matches the representative wavelet model.

Referring back to FIG. 7, the fingerprinting analysis 703 of the two models is accomplished by calculating a Frechet distance defined as $$\inf_{\alpha,\beta} \max_{t \in [0,1]} \{d(A(\alpha(t)), B(\beta(t)))\}$$

where d( ) is the distance function, and A and B are two functions over all evaluations $\alpha$ and $\beta$ in the range $0 <= t <= 1$. The distance is a product of the current and voltage. Thus, for each of the 128 indices in the two models, the voltage difference and the current difference are multiplied to find the distance between the representative wavelet model and the combined predictive model. If the calculated Frechet distance between the representative wavelet model and the combined predictive model is large, the combined predictive model does not closely mirror the representative wavelet model (i.e., the devices contributing to the combined predictive model are not the same electrical devices contributing to the representative wavelet model), whereas if the calculated Frechet distance is small, the combined predictive model closely approximates the measured electrical devices on building electrical circuit 107.

Machine learning analysis 704 analyzes waveform signatures with a multivariate support vector machine (SVM) to determine which of the combined predictive models built from known waveform signatures most closely match the representative wavelet model. As discussed above, one complete representative wavelet comprises one data point in a set of data points (the representative wavelet model) that represents one electrical device or a set of electrical devices. When ADC 301 collects one waveform signature comprising 100 mean wavelets that are known to be from a 60 watt incandescent light bulb, each of the 128 sample points on a single wavelet are features of that wavelet. Thus, the 100 wavelets become multi-feature data points in the training set for the SVM. Using a non-linear kernel for classification, the representative wavelet model is compared against one or more combined predictive model to determine whether one or more combined predictive model matches the representative wavelet model and how well the representative wavelet model matches the one or more combined predictive model, thereby allowing identification of the combined predictive model that most closely matches the representative wavelet model (i.e., the "best" combined predictive model).

If server 203 determines from the comparison of the combined predictive model and the representative wavelet model (using one or more of the analyses described above in steps 701, 702, 703, and/or 704) that the models match, then the electrical devices on building electrical circuit 107 are characterized (as stated above regarding step 607 of FIG. 6). Examples of the electrical device characterization of step 607 (discussed above with respect to FIG. 6) are detailed in FIG. 7. In particular, server 203 determines the known waveform signatures contributing to the combined predictive model in order to characterize the device(s) contributing to the representative wavelet model (step 705, and optionally step 706 and/or optionally step 707, discussed below).

In step 705, server 203 identifies the device(s) contributing to the representative wavelet model by determining which device(s) generated the known waveform signatures comprising the combined predictive model.

In step 706, server 203 identifies the device operating modes(s) contributing to the representative wavelet model by determining which operating mode(s) for the identified device(s) generated the known waveform signatures comprising the combined predictive model. This step is optional, and can be performed after step 707.

In step 707, server 203 identifies the device performance state(s) contributing to the representative wavelet model by determining which performance state(s) for the identified device(s) generated the known waveform signatures comprising the combined predictive model. This step is optional, and can be performed before step 706.

Because data are collected over time about the electrical characteristics of known devices as they operate normally, deteriorate, and fail, these patterns of performance can be correlated to operation of other devices of the same type to predict the probability and likely time of failure for individual devices.

Behavioral factors that can contribute to device failures (such as device lifetime in service, total time powered on, and environmental feedback (e.g., air conditioning unit running in winter versus in summer)) can be used as well to better detect and predict failure modes and mechanisms of failure. These factors can be ranked using correlational techniques (e.g., Pearson product moment correlation) and used in conjunction with the current waveform measurement to detect when a device is failing, predict when it will fail, and postulate the mechanism of failure.

Providing these types of prediction through feedback to the consumer can allow consumers to address potential device failures early and thereby minimize costs and work disruption due to unforeseeable maintenance needs and/or device failure.

Knowledge about performance of electrical devices on the building circuit can be used in conjunction with power management systems to allocate energy needs as desired. For example, knowledge of which electrical devices are active on the building circuit during peak usage time can be implemented by power management systems to divert usage of electrical devices to non-peak usage times. As another example, predictions about when an electrical device might fail can be input to known power management systems which can use that information to divert the load off that electrical device before failure.

Feedback can also be provided to show consumers where their electricity is being used so as to allow consumers to tailor their energy usage. For example, a consumer's fastest server might use three times as much electricity as his second fasted server, but might be only marginally faster. With appropriate feedback, the consumer can divert more electricity usage to the second server to better minimize energy usage and business costs.

It is to be understood that the examples given are for illustrative purposes only and may be extended to other implementations and embodiments with a different set of sensors, conventions, and techniques. While a number of embodiments are described, there is no intent to limit the disclosure to the embodiment(s) disclosed herein. On the contrary, the intent is to cover all alternatives, modifications, and equivalents apparent to those familiar with the art.

Further, it is to be understood that the embodiments described herein can all be implemented in software stored in a computer readable storage medium for access as needed to run such software on the appropriate processing hardware.

In the foregoing specification, the invention is described with reference to specific embodiments thereof, but those skilled in the art will recognize that the invention is not limited thereto. For example, one of skill in the art will recognize that communication between energy monitor 201 and server 203 can also be transmitted over power line 102 using known protocols, preferably specifications controlling power line communications such as ZIGBEE or HOMEPLUG. Various features and aspects of the above-described invention may be used individually or jointly. For example, in various embodiments, the database of server 203 can contain known waveform signatures obtained from multiple building electrical circuits 107 within one building 106, and/or known waveform signatures can have been obtained for electrical devices operating on different building electrical circuits 107 (e.g., one known waveform signature from an electrical device operating on one building electrical circuit 107 and another known waveform signature from an electrical device operating on another building electrical circuit 107 in either the same or different buildings).

Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of characterizing an electrical device comprising:
 a. measuring an aggregated waveform from a building electrical circuit, the aggregated waveform resulting from current flow on the building electrical circuit through one or more device connected to the building electrical circuit;
 aa. digitizing and denoising the aggregated waveform;
 b. determining a representative wavelet model from the digitized and denoised aggregated waveform, the representative wavelet model comprising a mean current and a standard deviation at each time index of a representative wavelet, the means and standard deviations of the representative wavelet being calculated from sample wavelets from the digitized and denoised aggregated waveform, each sample wavelet having a current measurement at each of multiple time indices throughout the wavelet;

c. communicating the representative wavelet model over a network to a server;

d. creating a combined predictive model by combining two or more known waveform signatures, each known waveform signature calculated from multiple wavelets captured from an isolated electrical circuit to which a known electrical device was connected, each waveform signature comprising a mean current and a standard deviation at each time index of the known waveform signature, the mean currents and standard deviations of the known waveform signature being calculated from the multiple wavelets from the isolated electrical circuit to which the known electrical device was connected, each wavelet of the multiple wavelets having a current measurement at each of multiple time indices throughout the waveform signature;

e. comparing at the server the combined predictive model to the communicated representative wavelet model; and f. characterizing at least one of the one or more electrical devices connected to the building electrical circuit when the compared combined predictive model and the representative wavelet model match.

2. The method of claim 1 further comprising creating another combined predictive model combination when the combined predictive model and the representative wavelet model do not match, and repeating steps (e) and (f) with the another combined predictive model in place of the combined predictive model.

3. The method of claim 1 wherein the step of characterizing at least one of the one or more electrical devices connected to the building electrical circuit comprises identifying at least one of the one or more electrical devices.

4. The method of claim 1 wherein the known waveform signatures comprise a known waveform signature for an operating mode of the known electrical device.

5. The method of claim 4 wherein the step of characterizing at least one of the one or more electrical devices connected to the building electrical circuit comprises identifying the operating mode of at least one of the one or more electrical devices.

6. The system of claim 1 wherein the known waveform signatures comprise a known waveform signature for a performance state of the known electrical device.

7. The method of claim 6 wherein the step of characterizing at least one of the one or more electrical devices connected to the building electrical circuit comprises identifying the performance state of at least one of the one or more electrical devices.

8. The method of claim 1 wherein the step of comparing the combined predictive model to the representative wavelet model comprises performing a transform and frequency analysis.

9. The method of claim 8 wherein the transform and frequency analysis is a Fourier analysis.

10. The method of claim 1 wherein the step of comparing the combined predictive model to the representative wavelet model comprises performing a statistical time domain comparison analysis.

11. The method of claim 1 wherein the step of comparing the combined predictive model to the representative wavelet model comprises performing a fingerprinting analysis.

12. The method of claim 11 wherein the fingerprinting analysis is a Frechet analysis.

13. The method of claim 1 wherein the step of comparing the combined predictive model to the representative wavelet model comprises performing a machine learning analysis.

14. A system to characterize an electrical device connected to a building electrical circuit comprising:

an energy monitor configured to
connect to the building electrical circuit;
measure an aggregated waveform from the building circuit, the aggregated waveform resulting from current flow on the building circuit through one or more device connected to the building circuit;
digitize and denoise the aggregated waveform;
determine a representative wavelet model from the digitized and denoised aggregated waveform, the representative wavelet model comprising a mean current and a standard deviation at each time index of a representative wavelet, the means and standard deviations of the representative wavelet being calculated from sample wavelets from the digitized and denoised aggregated waveform, each sample wavelet having a current measurement at each of multiple time indices throughout the wavelet; and
communicate across a communication network; and a server configured to
communicate across the communication network with the energy monitor to obtain the representative wavelet model;
create a combined predictive model by combining two or more known waveform signatures, each known waveform signature calculated from multiple wavelets captured from an isolated electrical circuit to which a known electrical device was connected, each waveform signature comprising a mean current and a standard deviation at each time index of the known waveform signature, the mean currents and standard deviations of the known waveform signature being calculated from the multiple wavelets from the isolated electrical circuit to which the known electrical device was connected, each wavelet of the multiple wavelets having a current measurement at each of multiple time indices throughout the waveform signature;
compare the combined predictive model to the representative wavelet model; and
characterize at least one of the one or more of the electrical devices operating on the building circuit based on a comparison of the combined predictive model with the representative wavelet model.

15. The system of claim 14 wherein the server configured to characterize at least one of the one or more electrical devices operating on the building electrical circuit is further configured to identify at least one of the one or more electrical devices.

16. The system of claim 14 wherein the known waveform signatures comprise a known waveform signature for an operating mode of the known electrical device.

17. The system of claim 16 wherein the server configured to characterize at least one of the one or more electrical devices operating on the building electrical circuit is further configured to identify the operating mode of at least one of the one or more electrical devices.

18. The system of claim 14 wherein the known waveform signatures comprise known waveform signatures for more than one performance state of the known electrical device.

19. The system of claim 18 wherein the server configured to characterize at least one of the one or more electrical devices operating on the building electrical circuit is further configured to identify the performance state of at least one of the one or more electrical devices.

20. A non-transitory computer readable storage medium having stored thereupon computing instructions comprising:

a code segment to measure an aggregated waveform from a building electrical circuit, the aggregated waveform resulting from current flow on the building electrical circuit through one or more device connected to the building electrical circuit;

a code segment to digitize and denoise the aggregated waveform;

a code segment to determine a representative wavelet model from the digitized and denoised aggregated waveform, the representative wavelet model comprising a mean current and a standard deviation at each time index of a representative wavelet, the means and standard deviations of the representative wavelet being calculated from sample wavelets from the digitized and denoised aggregated waveform, each sample wavelet having a current measurement at each of multiple time indices throughout the wavelet;

a code segment to create a combined predictive model by combining two or more known waveform signatures, each known waveform signature calculated from multiple wavelets captured from an isolated electrical circuit to which a known electrical device was connected, each waveform signature comprising a mean current and a standard deviation at each time index of the known waveform signature, the mean currents and standard deviations of the known waveform signature being calculated from the multiple wavelets from the isolated electrical circuit to which the known electrical device was connected, each wavelet of the multiple wavelets having a current measurement at each of multiple time indices throughout the waveform signature;

a code segment to compare the combined predictive model to the communicated representative wavelet model; and a code segment to characterize at least one of the one or more electrical devices connected to the building electrical circuit when the compared combined predictive model and the representative wavelet model match.

* * * * *